Feb. 1, 1966 E. D. PIERSON ETAL 3,232,409
CONVEYOR INTERSECTION
Filed March 13, 1964 12 Sheets-Sheet 1

INVENTORS
EDWARD D. PIERSON
JAMES C. WRIGHT
BY
*Anderson, Spangler & Wymore*
ATTORNEYS

INVENTORS
EDWARD D. PIERSON
JAMES C. WRIGHT
BY
ATTORNEYS

INVENTORS
EDWARD D. PIERSON
JAMES C. WRIGHT
BY

ATTORNEYS

INVENTORS
EDWARD D. PIERSON
JAMES C. WRIGHT

ATTORNEYS

Feb. 1, 1966    E. D. PIERSON ETAL    3,232,409
CONVEYOR INTERSECTION

Filed March 13, 1964    12 Sheets-Sheet 8

INVENTORS
EDWARD D. PIERSON
JAMES C. WRIGHT
BY
Anderson, Granger & Nemore
ATTORNEYS Feb. 1, 1966 E. D. PIERSON ETAL 3,232,409
CONVEYOR INTERSECTION
Filed March 13, 1964 12 Sheets-Sheet 11

INVENTORS
EDWARD D. PIERSON
JAMES C. WRIGHT
BY

ATTORNEYS

INVENTORS
EDWARD D. PIERSON
JAMES C. WRIGHT
BY

ATTORNEYS

United States Patent Office 3,232,409
Patented Feb. 1, 1966

3,232,409
CONVEYOR INTERSECTION
Edward D. Pierson and James C. Wright, Denver, Colo., assignors to Miner Machine Company, Denver, Colo., a corporation of Colorado
Filed Mar. 13, 1964, Ser. No. 351,797
20 Claims. (Cl. 198—20)

This invention relates to intersecting conveyor systems and is a continuation-in-part of our application for Letters Patent of the United States Serial No. 183,231 filed March 28, 1962, now Patent No. 3,134,476.

Our co-pending application referred to above is directed primarily to a cornering unit for conveyor systems by which two or three conveyors could be joined together at right angles to form either a "T" or "L" intersection. While with minor modifications, it would convey items straight across the intersection in any one of four possible directions, this was not its primary objective or value. Also, reversal of flow of the items being conveyed, while entirely possible, was intended to be performed on a more or less intermittent rather than an instantaneous basis as the direction of rotation of a reversible motor had to be changed or a reversing gear train engaged by a clutch. In other words, it was engineered to accomplish the principal function of automatically moving a conveyed item around a corner in a conveyor system where the flow of material remained relatively constant insofar as direction is concerned for extended periods of time. Obviously, the latter is a characteristic of most conveyor installations which are more or less static in their requirements.

The apparatus of the present invention, on the other hand, is specifically designed to provide the ultimate in versatility for those operations wherein a single system must perform a wide variety of different functions. For example, the units comprising the intersection are all reversible making it possible to change the direction of material flow at any time and as often as necessary from a remote control station. Thus, components of an assembly can be moved from a supply area to the place where they are put together by running the system in one direction and then returned to inventory in finished form on the same conveyor by running it in the opposite direction. Perhaps the most common use of the apparatus forming the subject matter of the present application is, however, in combining the output of two or three lines into a common line or, conversely, disbursing the output of a single line to two or more branch lines. Such a situation might well be found in a manufacturing operation where raw materials were being unloaded from a single truck or freight car and distributed to several supply areas within the plant. It is conceivable that the same conveyor system might also be used to carry the output of a single assembly line to several loading docks.

Obviously, a situation similar to that outlined in the preceding paragraph could be further complicated by having two or more intersecting conveyor systems operating in combination with one another. A moment's reflection on such a system, whether it be in the simpler form having only one "X" intersection or several "X" and "T" intersections, will reveal the fact that a significant traffic control problem exists. In other words, with items coursing toward the intersection from two or three different directions at the same time, means must be provided for regulating their entry one-at-a-time if difficulties are to be avoided. In this sense, the apparatus herein described is considerably more sophisticated than that of our earlier application aforementioned where the only problem of traffic control that required solution in most applications was the interval at which the conveyed items reached the corner on a single line. The present apparatus, on the other hand, does not admit itself to such a simple solution because, in addition to the interval problem just mentioned, items may arrive at the intersection simultaneously from as many as three different converging lines.

Thus, while the overall functions performed by the apparatus of our earlier application and this one have much in common as do some of the specific pieces of equipment, the versatility of the apparatus herein set forth is much enhanced and it is capable of handling conveying operations for which the former equipment was ill-suited. Accordingly, it is the principal object of the present invention to provide a novel and improved intersection for a multiple-line conveyor system.

A second object of the invention is the provision of apparatus of the character aforementioned which includes provisions for reversing any component from a remote control station.

Another objective is the provision of a conveyor system incorporating an intersection that is ideally suited to both distribution and collection functions.

Still another object of the instant invention is to provide a unique traffic control apparatus operatively associated with the intersection that will regulate both the interval and sequence of the items being conveyed from a remote control station or, if preferred, automatically in response to actuation of sensing mechanisms which operate holding stations.

An additional objective is the provision of a multiple-line conveyor intersection that can be operated straight through, as an "L" corner, a "T" intersection or an "X" interchangeably.

Further objects are the provision of a powered conveyor line intersection that is extremely versatile, compact, rugged yet gentle in the way it handles the material being conveyed, relatively free of maintenance problems, decorative in appearance, and one that is adaptable for use in a wide variety of conveyor installations to handle various sizes, types and shapes of products.

Other objects will be in part apparent and in part pointed out specifically hereinafter in connection with the description of the drawing that follows, and in which.

Figure 1:
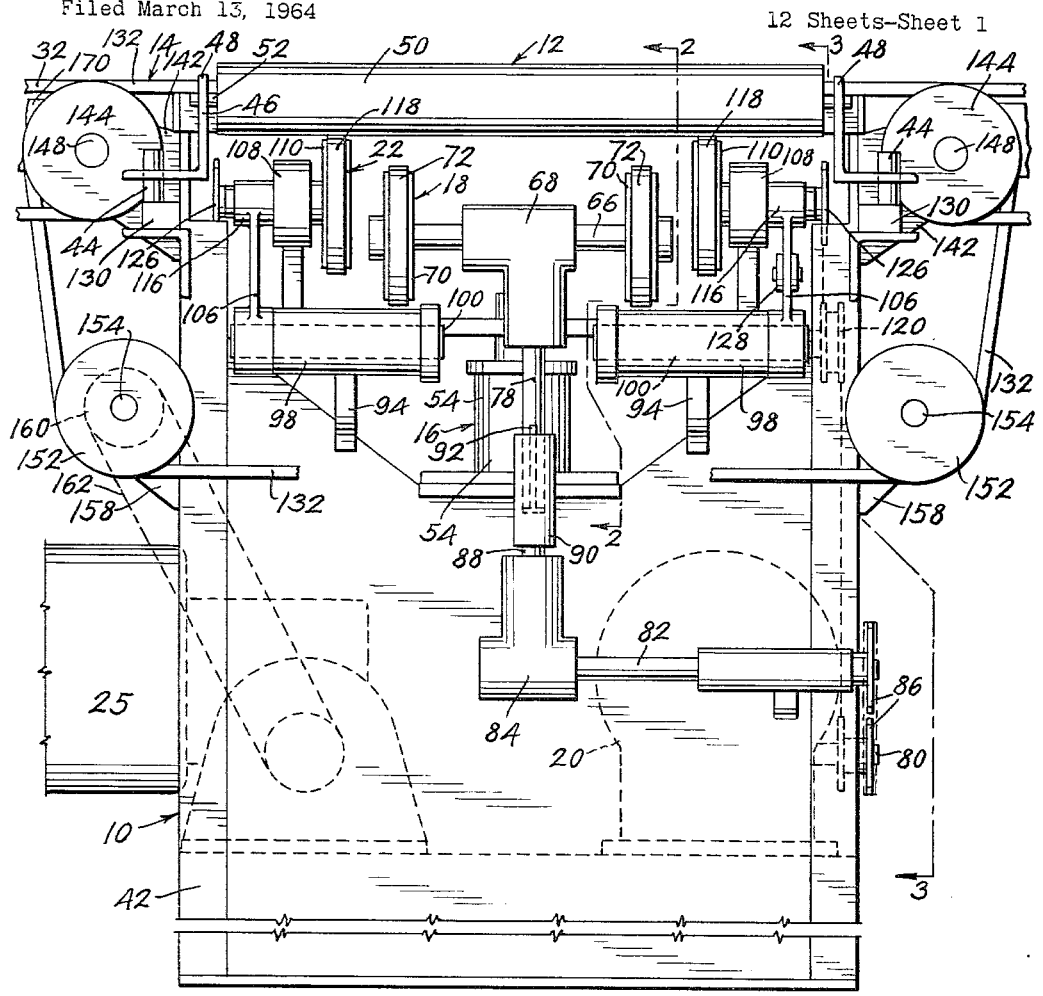
FIGURE 1 is a side elevation showing corner transfer unit of the intersection assembly, portions thereof having been broken away to conserve space and better reveal the interior construction.

Referring initially to the first thirteen figures of the drawing, it would, perhaps, be well to outline the functions of the various elements of the intersection assembly, mention how they cooperate with one another and integrate into a conveyor system before proceeding with a detailed description of the several components so as to render such a detailed analysis more meaningful. In broad terms, the present invention comprises a group of functional components that cooperate with one another to produce an intersection assembly useful in a conveyor system. The particular type of conveyor lines that feed or are fed by the intersection assembly claimed herein are not particularly significant except that they must be capable of carrying more or less regularly shaped items such as, for example, those in cartons, bundles, stacks, packages, etc., as contrasted with those designed to transport loose goods like powdered granular or crushed materials, irregularly shaped piece goods and the like.

The intersection of the present invention realizes its ultimate versatility when incorporated into two conveyor lines crossing one another at right angles or, if preferred, four conveyor lines spaced angularly 90° apart that meet at a common point. It should be mentioned, however, that for purposes of the present description, the term "conveyor line" is intended to include not only close-ended gravity or powered run but, in addition, a short open-ended stub or branch run intersecting a main run and used for either introducing items into the main line or withdrawing same therefrom. In other words, an intersection assembly of the type disclosed herein is quite useful in feeding or discharging conveyed items to or from a longer run intermediate the ends thereof and, in this situation, it functions exactly the same as if the long main run were intersected by a second long run at right angles thereto. Conversely, it will become apparent as the description proceeds that the assembly of the present invention is unnecessary in a single straight run conveyor, is overdesigned for use as a simple "L" corner, and is not being employed to its full potential in even a "T" intersection; therefore, while the unit will work in both the "L" corner and "T" intersection to accomplish a useful function, as far as the present description is concerned, major emphasis will be placed on its use in an "X" intersection which is its most sophisticated application.

The corner transfer unit of the assembly which has been designated in a general way by reference numeral 10 provides roller conveyor means 12 by which an article can be transported across the surface thereof in either of two directions bearing a reciprocal relationship to one another, belt conveyor means 14 by which said article can be conveyed in either of two reciprocal directions disposed at right angles to the flow of goods across the roller conveyor means, shift means 16 by which one of the roller conveyor means or belt conveyor means is instantly placed in active position while the other is simultaneously inactivated to accomplish a right angle change in the direction of movement of the conveyed article, first friction drive means 18 operatively interconnecting a unidirectional prime mover 20 with the roller conveyor means 12 to drive the latter in one direction, second friction drive means 22 connected to the prime mover 20 for the roller conveyor means and operative upon actuation to drive the latter in the opposite direction, friction drive shift means 24 operatively connected to the second friction drive means for moving same from an inactive to an active position upon actuation while simultaneously inactivating the first friction drive means, and an instantly reversible prime mover 25 operatively connected to the belt conveyor means 14. Thus, unit 10 in and of itself is capable of conveying articles across its surface in any one to four different directions, reversing the direction of movement of the conveyed articles or accomplishing a right angle change in direction of the articles passing onto its surface.

Other important elements of the intersection assembly are the belt conveyor holding stations that have been broadly designated by numeral 26 and which are preferably located at both ends of the belt conveyor means 14 in position to form extension thereof. The maximum versatility of the assembly is realized when a pair of these holding stations 26 are located one at each extremity of the belt conveyor means; however, as will become apparent as the description proceeds, it may be possible to eliminate one, or even both in certain installations where no traffic control is required as the conveyed articles enter or leave the belt conveyor means. In the particular form shown, both belt conveyor holding stations are actually an integral part of the principal unit 10 being operatively linked thereto by a common drive; however, this need not be the case as the holding stations could be entirely separate as are their counterparts, the roller conveyor holding stations 28.

The main element of functional interest in the belt conveyor holding stations is the lifting means 30 by which the conveyed articles entering the belt conveyor means of unit 10 are lefted free off the belt 32 of said holding station and stopped for the pre-determined interval required to allow unit 10 to clear.

Another significant component of the assembly that has already been mentioned briefly is the roller conveyor holding station that has been broadly designated by numeral 28 and which functions to stop an article moving onto the roller conveyor means of the main unit for the pre-determined interval required for the latter to clear in the same manner as the belt conveyor holding stations. Here again, preferably two of such holding stations are disposed at opposite ends of the roller conveyor means of the main unit; however, this is a function of traffic control of those conveyed items entering the main unit by virtue of the roller conveyor means and one or both of said roller holding stations may be unnecessary in certain material handling operations. It has also been mentioned that these roller holding stations are entirely separate from the principal unit in the particular assembly illustrated herein although they are linked together from the functional and operational standpoint by the master control system so as to cooperate very closely with one another.

In the belt conveyor holding stations, the lifting means elevates the article being conveyed above the belts which continue to run; whereas, in the roller holding stations 28, braking means 34 act upon actuation to engage the underside of the rollers and lift them off the friction belt drive mechanism 36 thus causing the rollers to stop. Both roller holding stations have their own separate reversible prime mover 38 which is operatively linked through the control system to drive the rollers of both holding stations and the main intersection unit at the same speed and in the desired direction.

The remaining component of the assembly that needs to be considered in terms of the overall function is, of course, the control system that has been designated broadly by numeral 40. This control system reverses the directions of either the roller or belt conveyor means including the holding stations that form extensions thereof. In performing a cornering function, the control system senses the movement of a conveyed article onto the principal unit and automatically shifts between the roller and belt conveyor means to accomplish the desired change in direction. Finally, the control system acts at the holding stations to stop an item being conveyed until a previously introduced item clears the intersection or until an item being held at another holding station is released and cleared.

With this brief overall description of the most important functional components of the intersection assembly and their relationship to one another, it is desirable to proceed with a detailed description thereof. For this purpose, initial reference will be made to FIGURES 1–8, inclusive, where the main corner transfer unit 10 is illustrated.

The corner transfer unit has a floor-mounted base 42 which provides the supporting structure carrying the remaining elements of the unit. No useful purpose would be served by describing the many structural members of which the base is made up in detail as it may take several different forms all of which would suffice to fulfill the desired support function for the operative elements. Thus, in the interests of brevity, such a detailed analysis will be eliminated except for those few instances where elements of the base are functionally significant, it being understood that the necessary walls, bottom, braces, brackets, etc., could be designed by anyone of ordinary mechanical skill.

At the top of the base on each of the four corners, an upstanding pin 44 is provided that floatingly supports the roller frame 46 for vertical movement. The roller frame 46 has a pair of angle iron frame elements 48 that extend horizontally in spaced parallel relation to one another along opposite ends of the rollers 50. The roller shafts 52 that project coaxially from opposite extermities of each roller are mounted in the upstanding flanges of these angle iron frame elements 48 so as to be in spaced parallel relation to one another and provide an essentially horizontal conveying surface. The rollers are, of course, journalled for rotation on their respective roller shafts. The horizontal flange of these same angle iron elements of the roller frame are apertured to receive the upstanding pins 44 at the corners of the base. Thus, the roller conveyor means 12 is free to move up and down on the pins relative to the base and, for purposes of the present description, will be referred to as "floating."

Figure 2:
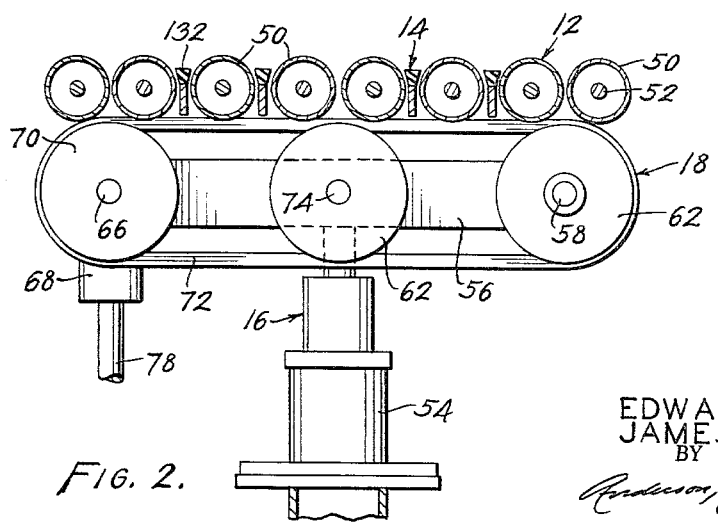
FIGURE 2 is a fragmentary section taken along line 2—2 of FIGURE 1 showing the belt drive for the rollers of the corner unit.
Figure 8:
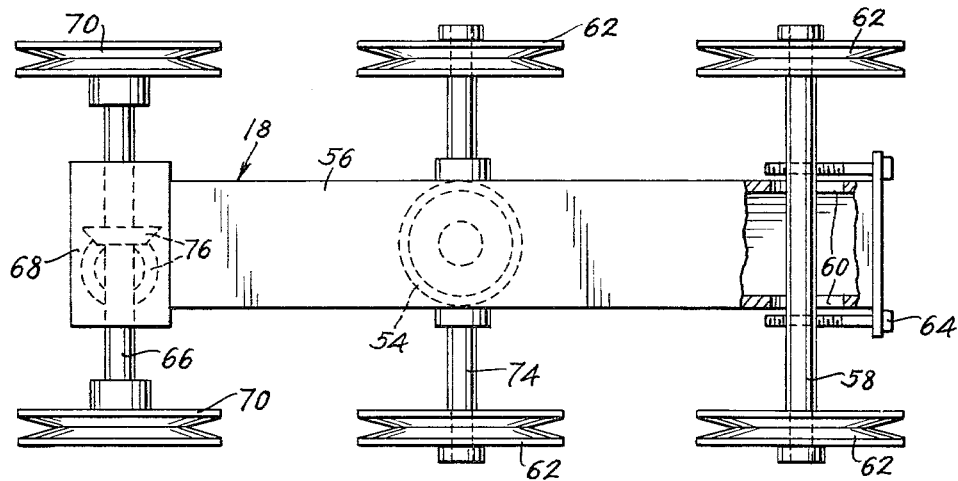
FIGURE 8 is a top plan view slightly enlarged and with portions broken away to better show the interior construction of the primary roller drive mechanism of the corner transfer unit.

The first friction drive means 18 by which the roller conveyor means is powered in one direction is best shown in FIGURES 1, 2 and 8 to which specific reference will now be made. Supported centrally on the base 42 is a pneumatic single-acting piston servo-motor 54 connected to the underside of pulley frame 56. FIGURE 1 shows the servo-motor before actuation in retracted position; whereas, FIGURE 2 illustrates the actuated or operative position thereof in which the drive means 12 is extended into an elevated position in driving relation to the roller conveyor means 12. The pulley frame carries an adjustable pulley shaft 58 mounted in longitudinal slots 60 at one extremity thereof. A pair of V-belt pulleys 62 are journalled for rotation on opposite ends of the shaft in laterally spaced relation to the frame 56. Belt-tightening means 64 adjustably mount the pulley shaft 58 in the slots in the frame.

At the opposite end of the pulley frame is a second pulley shaft 66 that is journalled for rotation within gear box 68. This shaft also carries V-belt pulleys 70 on its extremities mounted for rotation therewith and in longitudinal alignment with the pulleys 62. V-belts 72 provide a driving connection between the two sets of pulleys 62 and 70.

Between shafts 58 and 66 is a third shaft 74 which is non-rotatable and has the V-belt pulleys 62 at its ends. The latter shaft and pulleys merely cooperate with the shafts on the ends of the pulley frame to provide better support for the roller conveyor assembly 12 as can best be seen in FIGURE 2. Note in the particular structure illustrated that the rollers 50 are so arranged that the pulleys 62 and 70 are located between and underneath pairs thereof leaving only one roller on each side of the center pulleys that is not directly over one of the pulleys.

Figure 3:
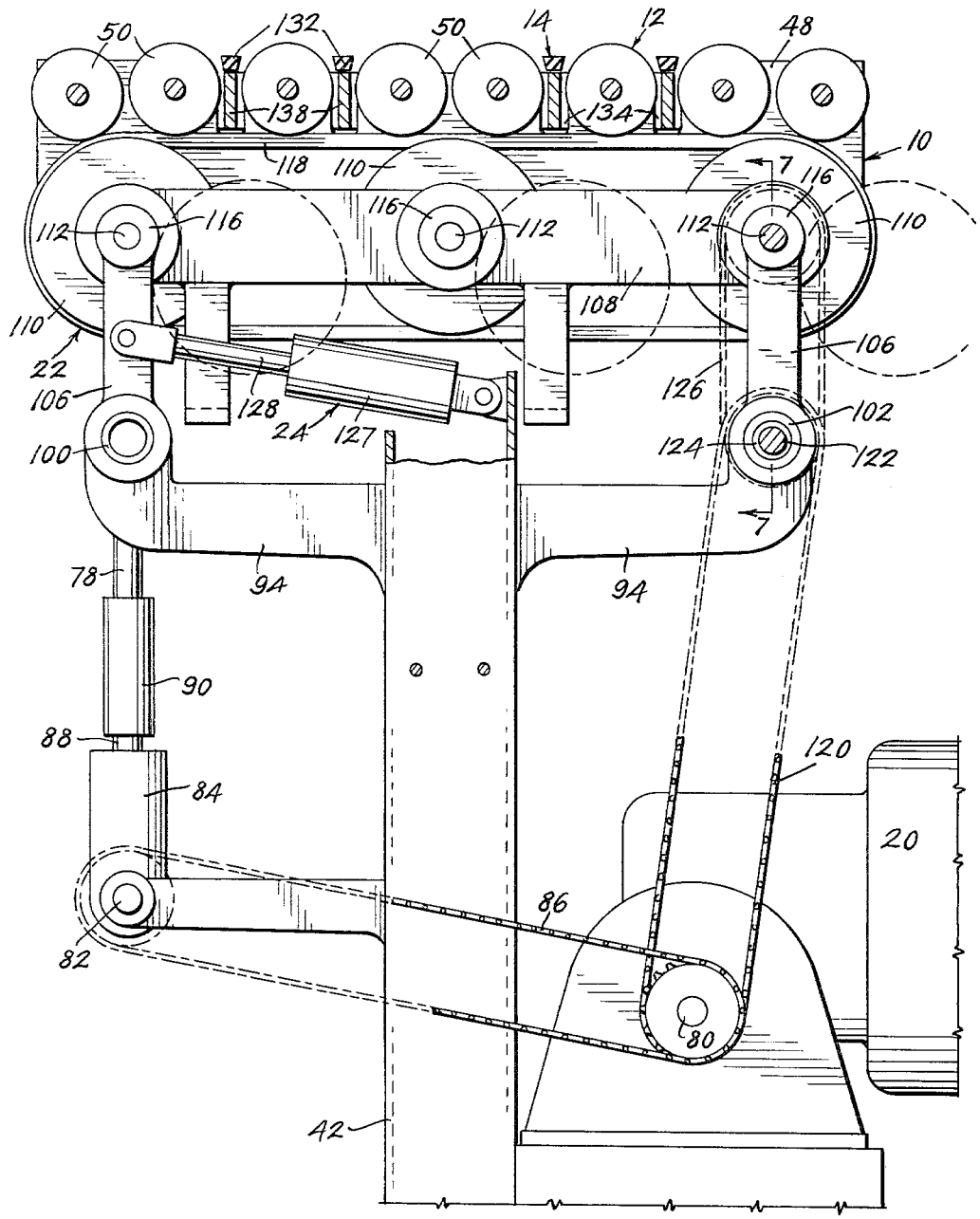
FIGURE 3 is a fragmentary section to an enlarged scale taken along line 3—3 of FIGURE 1 with portions broken away and shown in section to better reveal the construction of the roller drive mechanism.
Figure 4:
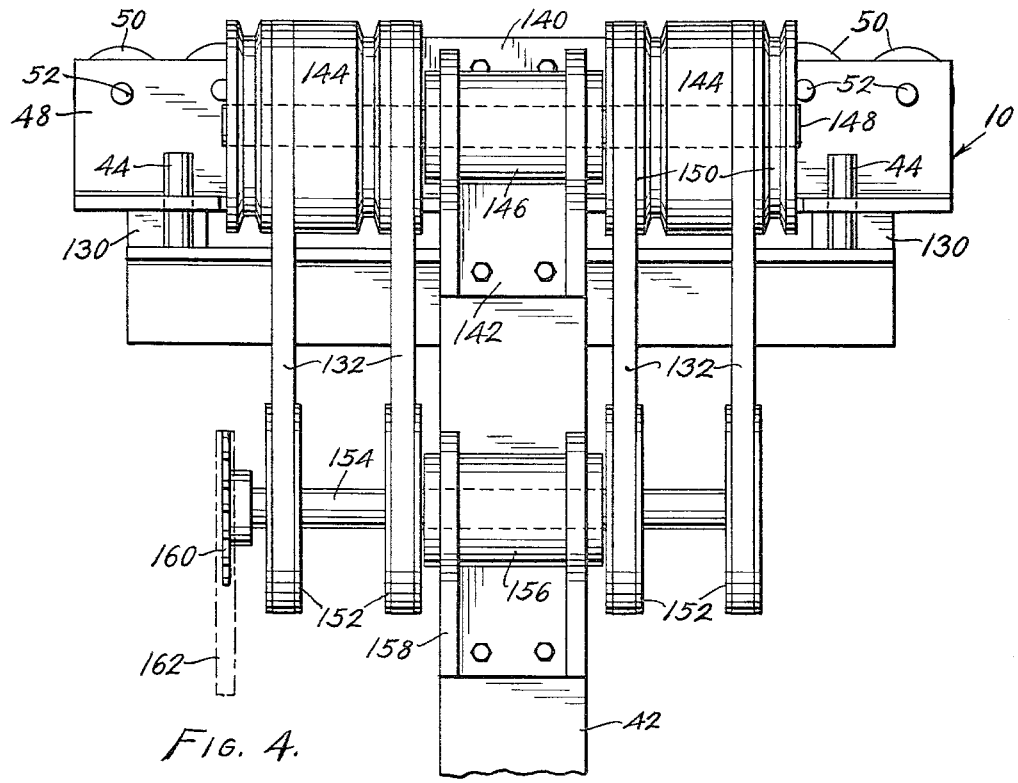
FIGURE 4 is a fragmentary end elevation of the corner transfer unit slightly enlarged as it would be seen looking to the right in FIGURE 1.

The manner in which shaft 66 is driven can best be described by including FIGURE 3 with FIGURES 1, 2 and 8 to which reference has been made previously. In the gear box 68 are housed a pair of bevel gears 76, one of which is carried on shaft 66 while the other is carried by a drive shaft 78 disposed at right angles to shaft 76. The unidirectional prime mover is so geared down as to provide a relatively low speed output available at shaft 80. Power is taken from shaft 80 and transferred to the input shaft 82 of right angle gear box 84 by means of a chain and sprocket power transfer mechanism designated broadly by reference numeral 86. Shaft 78 and the output shaft 88 from the right angle gear box 84 are interconnected within shaft coupling 90 to provide for relative axial adjustment therebetween. One simple way of providing such a connection has been shown in FIGURE 1, namely, providing shaft 78 with a key 92 and the coupling 90 with a keyway. This adjustment is, of course, necessary to maintain the driving relation between the prime mover and V-belt 70 while the first friction drive means 18 is being elevated from its inoperative retracted position of FIGURE 1 into the extended operative one of FIGURE 2. Thus, means are provided in the form of the first friction drive means 18 for turning the roller conveyor means 12 in one direction. Next, the second friction drive means 22 by which said roller conveyor means is turned in the opposite direction will be set forth in detail and for this purpose, reference will be had to FIGURES 1, 3, 6 and 7.

Stripped down to its bare essentials, the second friction drive means comprises little more than a belt and pulley assembly much like that of the first friction drive means except that, instead of being shifted vertically between its inoperative and operative positions, it utilizes rocker arms and associated linkage interconnected to form a parallelogram connection. Specifically, arms 74 forming part of the base 42 support a tube 96 that underlies shaft 58 of the first friction drive means 18. These same arms carry at their opposite ends a pair of tubular elements 98 that are coaxial but spaced apart to permit passage of shaft 78 and gear box 68 therebetween as shown in FIGURE 1. The latter tubular elements underlie shaft 66 of the first friction drive means.

The shorter tubular elements 78 each carry a stub shaft 100 therein mounted for limited rotational movement while the tube 96 has a hollow shaft 102 similarly mounted in bushings 104. Rocker arms 106 are mounted on both ends of the hollow shaft 102 and the outboard ends of stub shafts 100 in spaced parallel relation to one another. The rocker arms are, in turn, connected together by longitudinally-extending links 106 that are positioned alongside the first friction drive means but outboard thereof. These links complete the parallelogram connections by which the V-belt pulleys 110 are shifted between the full and dotted line positions of FIGURE 3. These pulleys are each mounted on the inner ends of shaft 112 which are journalled for rotation in bearings 114 carried within the bosses 116 at the ends of the rocker arms.

Figure 6:
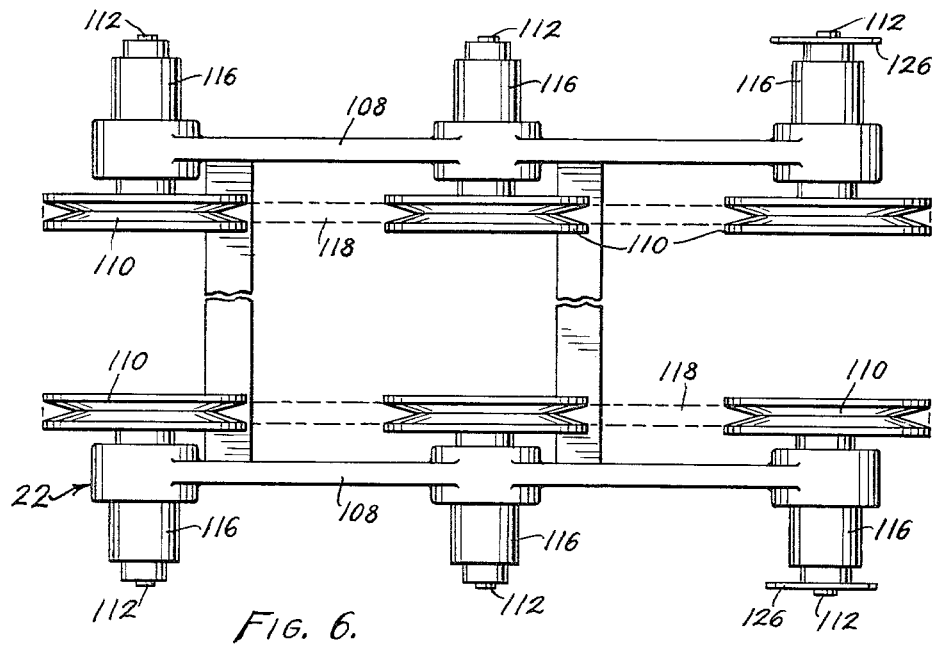
FIGURE 6 is a fragmentary top plane view slightly enlarged and with portions broken away to conserve space showing the rocker arm assembly of the secondary roller drive mechanism.
Figure 7:
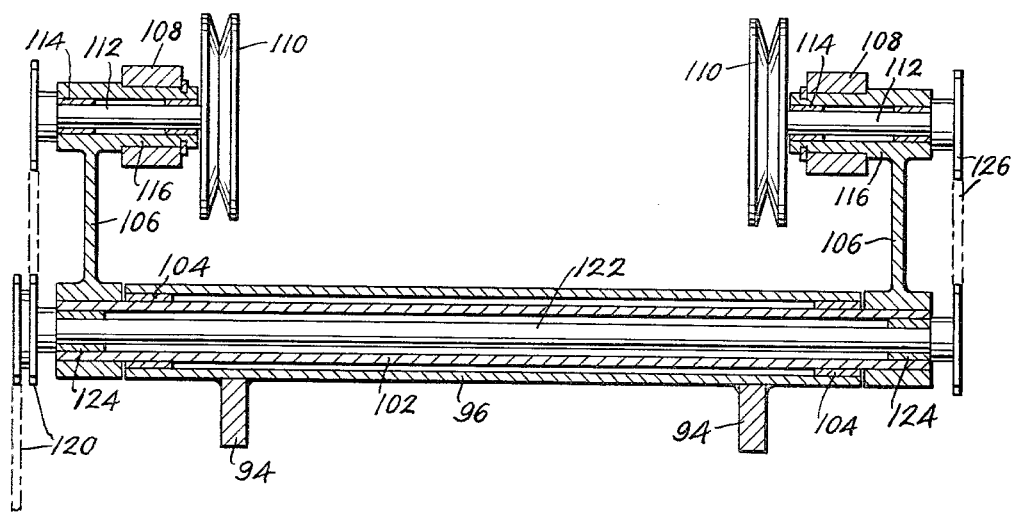
FIGURE 7 is a section to an enlarged scale of this rocker arm assembly taken along line 7—7 of FIGURE 3.

In FIGURES 3 and 6 it will be noted that links 108 preferably carry a third pair of pulleys 110, shafts 112 and bosses 116 less the rocker arms. All three pairs of pulleys are operatively interconnected by V-belts 118 as was the case with the pulleys of the first friction drive means 18.

These belts are driven by a chain and sprocket power transfer assembly 120 operatively interconnecting the low speed output shaft 80 of unidirectional prime mover 20 and shaft 122 that is journalled for rotation within bearing 124 on the inside of hollow shaft 102. Similar chain and sprocket mechanisms 126 form a driving connection between shaft 122 and the pulley shafts 112 that lie nearest thereto. One pulley 110 on each side of the first friction drive means must be driven off of shaft 122 directly; whereas, the V-belts 118 form the driving connection to the others.

Rockable movement of the second friction drive means 22 is accomplished by a shift mechanism 24 comprising nothing more than a double-acting piston servo-motor of the pneumatic type connected between the base and one of the rocker arms as shown most clearly in FIGURE 3. When in inoperative position, the pulleys of the second friction drive means occupy the position shown in dotted lines in FIGURE 3 that places the V-belts 118 out of engagement with the roller conveyor means 12 that is supported upon the belts 72 of the first friction drive means which would be raised into operative position. Instantly upon actuation of the control means in a manner to effect a change in the direction of rotation of the roller conveyor means, air is exhausted from the single-acting piston servo-motor 54 allowing the first friction drive means to drop down into its inoperative position shown in FIGURE 1 while, at the same time, air is supplied under pressure to the double-acting piston servo-motor 127 extending the piston rod 128 and raising the second friction drive means into its operative position supporting the roller conveyor means and driving the latter in the opposite direction. Note that both the first and second friction drive means run continuously in opposite directions although they derive their power from the same output shaft 80 of a unidirectional prime mover.

The first and second friction drive means also perform the negative function of deactivating the roller conveyor means. It is this situation which has been illustrated in FIGURE 4 wherein both the first and second friction drive means occupy their retracted inoperative positions allowing the floating roller frame 48 to drop down onto bumpers 130. In other words, when either of the friction drive means is operatively engaged in turning the rollers, the roller frame rests on the bumpers 130 which drops the top surface of the rollers below the corresponding surfaces of the belts 132 thus activating the belt conveyor means. It is significant to note in this connection that the rollers do not turn while the belt conveyor means is operative. This is accomplished by the simple expedient of selecting the height of bumpers 130 such that when the roller conveyor means rests thereon the rollers will be dropped down below the level of the belts 132 but not far enough down to remain in driving engagement with the belts 22 or 118 of either friction drive means when in retracted position. While there is nothing especially wrong about letting the rollers turn while they perform no conveying function, the better practice is to let only the first and second friction drive means remain running and disconnect them from the roller conveyor means.

Next, the details of the belt conveyor assembly 14 will be set forth and for this purpose specific reference will be made to FIGURES 1–5, inclusive, wherein it is most clearly shown. In the particular form illustrated, the rollers 50 are spaced apart to provide three different pairs, each pair of which is separated from the adjacent pair or pairs by a single roller. Thus, on the outside are two rollers side-by-side separated from the middel pair by single rollers spaced from the adjacent rollers of the pairs on both sides thereof. The belts 132 run on both sides of the single rollers making four belts in all as shown in FIGURE 3. The roller frame 48 is notched at 134 in the spaces between the rollers through which the belts are to pass. In the preferred embodiment of the invention illustrated herein, the belts 132 are supported as they traverse the intersection unit 10 by means of a belt supporting frame which has been designated broadly by numeral 136 and which includes rail-forming portions 138 that extend along between the rollers in the spaces provided for the belts. These rails pass through the notches 134 in the roller frame 48 and are interconnected by cross frame elements 140 that rest on upper bracket 142 which mounts the drum-type V-belt pulleys 144 for rotation. The rails are, of course, recessed beneath the load-carrying surface of the rollers and merely function to prevent the belts from sagging between the drum pulleys 144 on opposite sides of the roller frame 48. Actually, the inverted-trapezoidal cross-section of the V-belts fits nicely into the spaces between the rollers which cooperate to guide the belts along the top of the rails and prevent their moving from side to side.

Brackets 142 are mounted centrally on opposite ends of the base and carry journals 146 which receive shafts 148 for rotation. The drum-type pulleys 144 are mounted on the shaft 148 so that one of the grooves 150 is aligned with each of the notches in the roller frame through which the belts must pass to ride on the rails and be in proper position between the rollers. It is not possible for the V-belts 132 to be reeved back directly underneath the roller frame 48 as they might interfere with the movement of the latter and they would certainly cause problems with the friction drive means 18 and 22 which are moving at right angles thereto. Accordingly, the belts 132 are taken across underneath both of the friction drive means as shown most clearly in FIGURE 1 by merely providing two extra sets of pulleys 152 mounted lower down on the base. These pulleys are fixed to a shaft 154 which is rotatably mounted within a journal 156 carried by a bracket 158 fastened to the base underneath bracket 142.

A sprocket 160 is carried by one of the shafts 154 and is, in turn, connected to the low-speed output of instantly reversible prime mover 25 by means of sprocket chain 162. Note in this connection that the belt conveyor means 14 maintains a fixed position at all times and the roller conveyor means 12 shifts relative thereto. The dynamic forces developed in the belt conveyor means 14 are considerably less than in the roller conveyor means hence, it is possible to stop and instantly reverse the belts with an ordinary reversible gear motor of the type commercially available for this purpose. On the other hand, the loads on the first and second friction drive means due to the weight of the roller frame and the inertia developed in the rollers makes it impractical to handle the reversal function of the roller conveyor means with a reversible prime mover.

Figure 5:
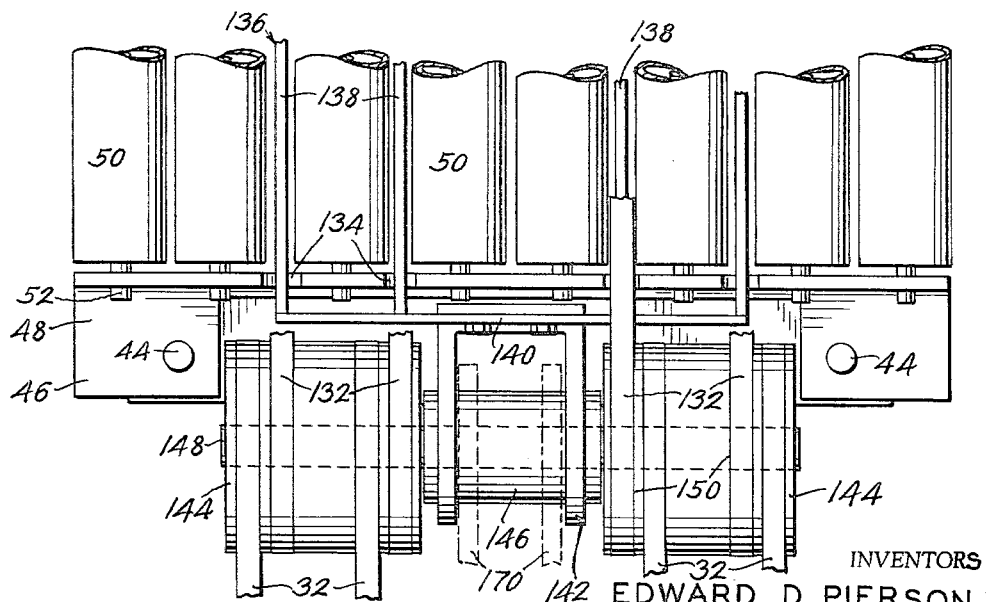
FIGURE 5 is a fragmentary top plan view to an enlarged scale showing the corner transfer unit and the driving connection between it and the holding station that forms an extension of its belt conveyor system.
Figure 11:
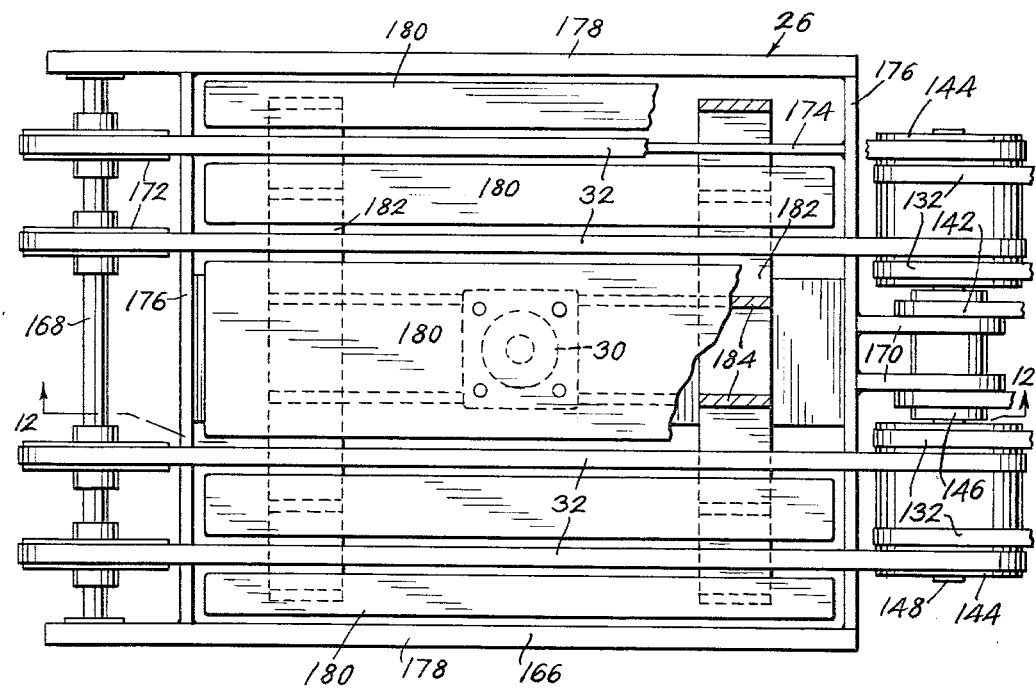
FIGURE 11 is a top plan view, portions of which have been broken away and shown in section, illustrating one of the belt holding stations that forms a continuation of the belt conveying surface of the corner transfer unit.
Figure 12:
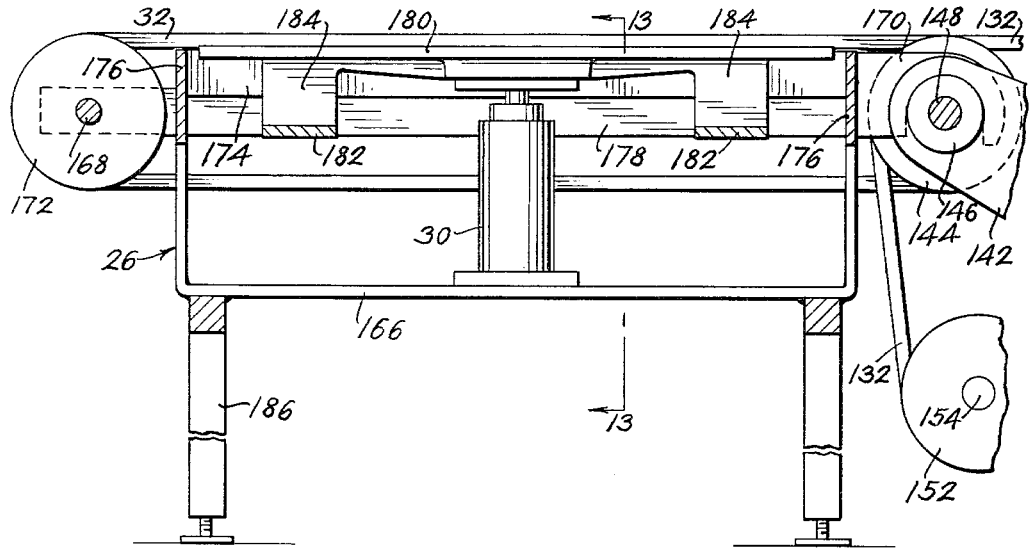
FIGURE 12 is a longitudinal section taken along line 12—12 of FIGURE 11.
Figure 13:
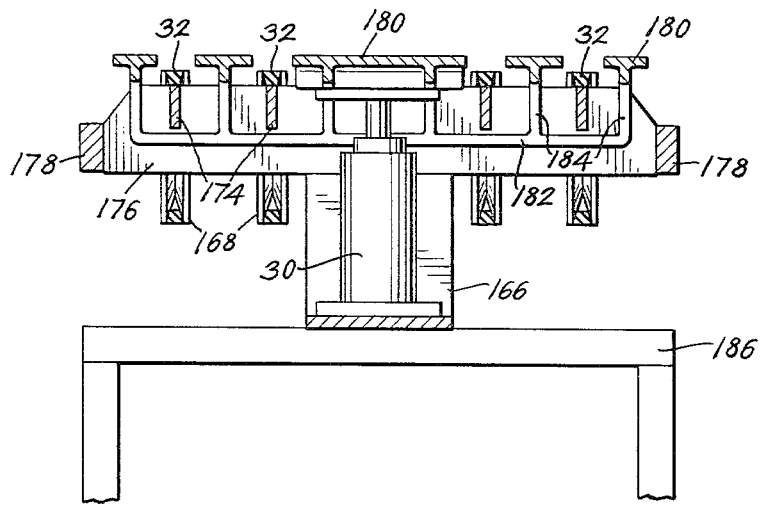
FIGURE 13 is a vertical section taken along line 13—13 of FIGURE 12.

The next element of the assembly requiring a detailed analysis is the belt holding station 26 that has been illustrated in FIGURES 12 and 13 although portions thereof have been shown in FIGURES 1 and 5. As has already been briefly mentioned, the belt holding stations can be independently-driven units of the assembly; however, they are shown operatively connected to the corner transfer unit 10 from which they derive their power. Drum-type pulleys 144 are shared by the corner transfer unit 10 and the adjacent belt holding station 26. For this reason, these drum pulleys each have two extra V-belt grooves 150 which receive the holding station V-belts 32. Shafts 148 are also shared with the adjacent holding station as they are connected to the holding station frame 166 in a manner to maintain a fixed spaced relationship between such common shaft and pulley shaft 168 that will keep belts 32 tight. There are, of course, several ways in which this can be accomplished, one of the simplest of which is to provide the holding station frame with a bracket 170 notched to receive the journal 146 as in FIGURES 5 and 11.

Shaft 168 is journalled within bearings 164 for rotation at the opposite end of the holding station frame in spaced parallel relation to shaft 148. This shaft carries ordinary V-belt pulleys 172 around which the V-belts 32 are reeved. These V-belts are driven from the drum-type V-belt pulleys 144 and no separate source of power is required to operate the belt holding stations. Note also that these holding station belts operate continuously and in the same direction as the belts 134 of the belt conveyor means.

Figure 9:
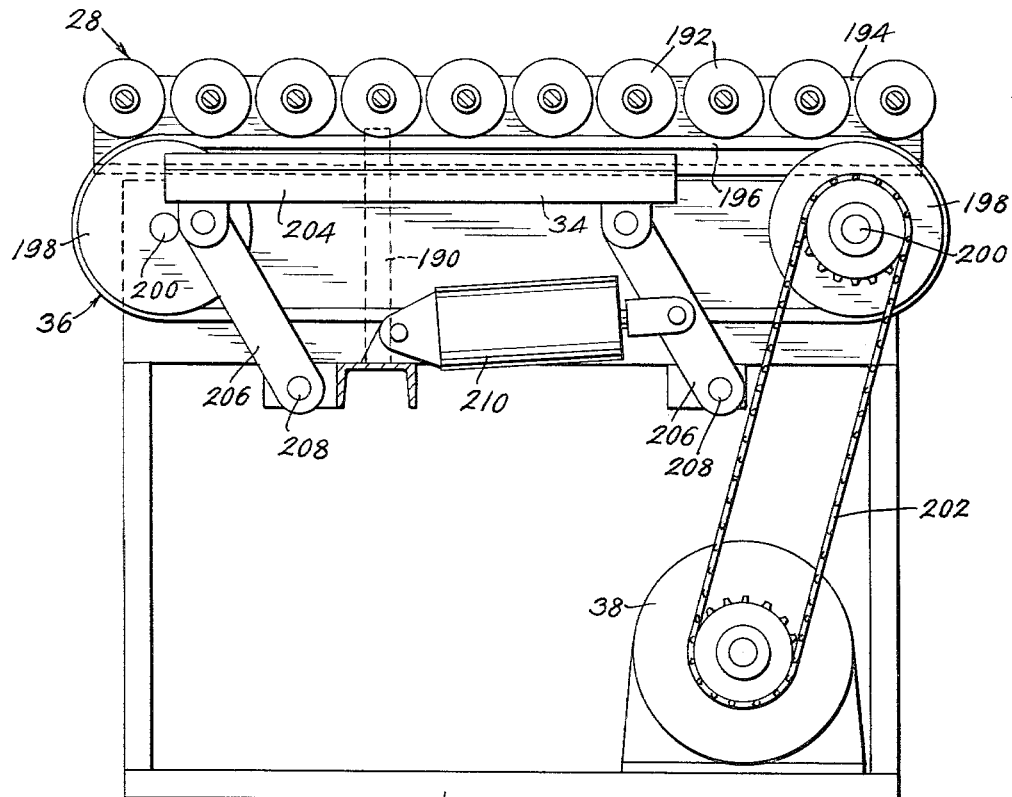
FIGURE 9 is a section taken along line 9—9 of FIGURE 10 showing one of the roller holding stations that form a continuation of the roller conveying surface of the corner transfer unit at both ends of the latter.
Figure 10:
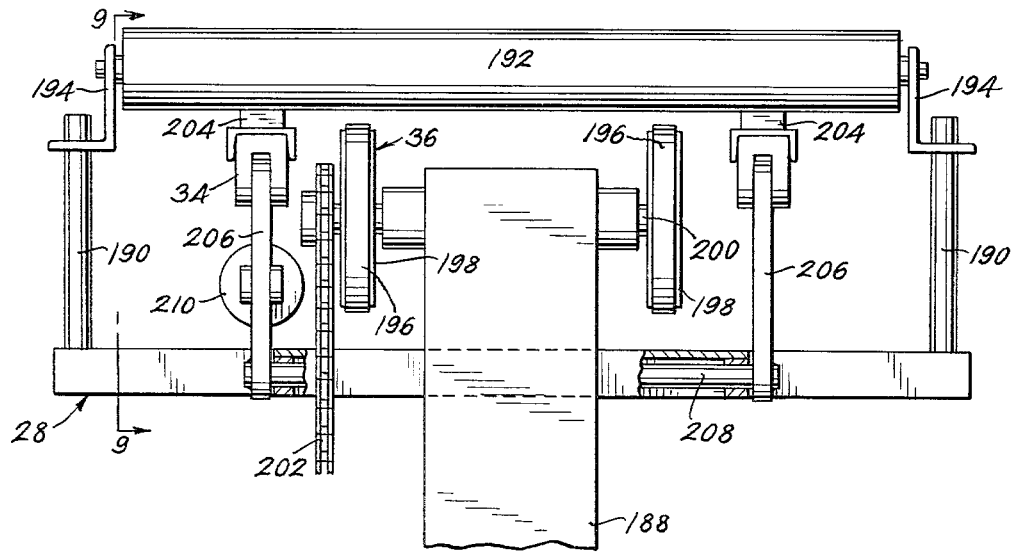
FIGURE 10 is a front elevation of the roller holding station, portions thereof having been broken away and shown in section, revealing the roller braking mechanism thereof.

As was the case with the corner transfer unit 10, the belt holding stations are provided with belt-supporting rails 174 that extend longitudinally between transverse elements 176 of the frame 166 and prevent the belts from sagging as they pass between the pulleys. The transverse elements 176 and side frame elements 178, frame 166 together with rails 174 define a plurality of generally rectangular openings in said frame through which the shoes 180 move upwardly to lift a conveyed article free of the moving belts 32. The center rectangular tray-like shoe is attached to the lifting means 30 which comprises a single-acting piston servo-motor of the pneumatic type adapted upon actuation to raise the shoes from the retracted position of FIGURE 12 to the elevated position of FIGURE 13. The remaining shoe-forming plates are connected to the center one by means of transverse legs 182 that pass underneath the rails 174 and upstanding webs 184. The frame 166 is mounted in fixed position on a base 186 that elevates the belts to the desired height off the floor. As has already been mentioned, the function of the belt holding stations 26 is to stop a conveyed article entering the belt conveyor means of the corner transfer unit until such unit clears or a previously programmed article enters and moves off. A similar function is performed by the roller holding stations 28 and reference will be made to FIGURES 9 and 10 for a detailed description thereof.

Each roller holding unit includes a floor-mounted base 188 having upright pins 190 located at the corner thereof in the same manner as has already been described in connection with the corner transfer unit. A plurality of rollers 192 are journalled for rotation between the side frame elements 194 of the floating roller frame which is free to move up and down on pins 190 as was the case with the corresponding elements of the corner transfer unit.

The rollers 192 normally rest upon the belts 196 of friction belt drive mechanism 36 which both supports and turns same. The belts 196 are reeved around V-belt pulleys 198 on axles 200 that are fixed in relation to the base 188. One of these axles is driven from reversible prime mover 38 to which it is operatively connected by means of chain and sprocket power transfer mechanism 202.

Some explanation should be given at this point concerning the necessity for an instantly reversible roller conveyor means on the corner transfer unit 10 of the intersection assembly when the roller holding stations 28 are equipped with only reversible gear motors as the means for accomplishing the reversing function. The reason is a simple one, namely, the roller conveyor means 12 of the corner transfer unit 10 in both collecting and distributing may have to reverse direction as often as once a second; whereas, the holding stations on opposite ends thereof seldom need to be reversed. For example, assume the intersection is being used as a collector with the belt conveyor means 14 and associated belt holding stations 26 being used as a straight-run unidirectional line while branch lines feed the corner transfer unit over the roller holding stations 28. The entire belt conveyor system including both belt holding stations and the belt conveyor means of the corner unit can be pre-set to run in one direction. In fact, with both belt holding stations driven off the same prime mover as the belt conveyor means of the corner transfer unit 10, all elements of the belt conveyor system must run in the same direction and they cannot, therefore, be used to collect or distribute in opposite directions from the intersection as can the roller conveyor system. The same is true of the roller holding stations because, whether collecting or distributing, they each continue to run in the same direction although opposite to one another and it is only the roller conveyor means of the intersection that must reverse instantly to accept a conveyed article from either side. The net effect of this is that a reversible motor such as provided on the roller holding stations and the belt conveyor system is entirely adequate to accomplish the intermittent changes in direction required of these elements. In actual practice, the belt conveyor means and associated belt holding stations will be set up on the main line and the roller holding stations used to distribute to or collect from branch lines.

Insofar as the roller holding stations 28 are concerned, there remains to be described the roller braking means 34. This braking means comprises a pair of brake shoes 204 extending along underneath the rollers 192 and supported pivotally on the upper ends of parallel links 206. These links 206 have their lower ends pivotally attached to the ends of shafts 208 that are, in turn, pivotally supported on the base to provide a parallelogram connection quite similar in all material respects to that which carries the second friction drive means of the corner transfer unit. A single-acting piston servo-motor 210 of the pneumatic type is pivotally connected between one of the links and a fixed element of the base. This servo-motor is operative upon actuation to raise the shoes from the retracted position of FIGURE 9 into the elevated position of FIGURE 10 wherein they engage the underside of the rollers 192 and raise them along with their supporting frame off of the friction belt drive. As the air pressure is taken off the piston of the servo-motor, the weight of the rollers and frame supporting same pushes the shoes into retracted position and allows the belt friction drive to re-engage them.

Figure 14:
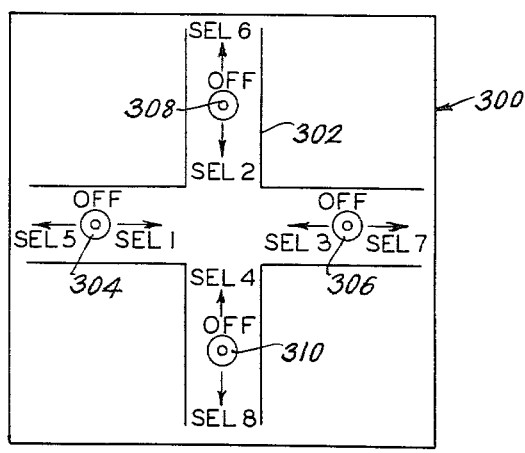
FIGURE 14 is a schematic representation of the control panel employed in the operation of the intersection assembly.

Before going into a detailed description of the control circuitry reference is had to FIGURE 14 which illustrates a control panel 300 having imprinted thereon a replica 302 of a cross-conveyor intersection. In each arm of the intersection, a 3-position (center OFF) switch is positioned with switches 304 and 306 being respectively in the left and right hand arms and switches 308 and 310 in the upper and lower arms. Movement of a switch actuator in the direction of an arrow closes the particular contacts associated with the arrow and controls the ingress and egress of articles in accordance with the program entered into the control panel 300 through the circuitry of FIGURES 16, 17 and 18.

Figure 15:
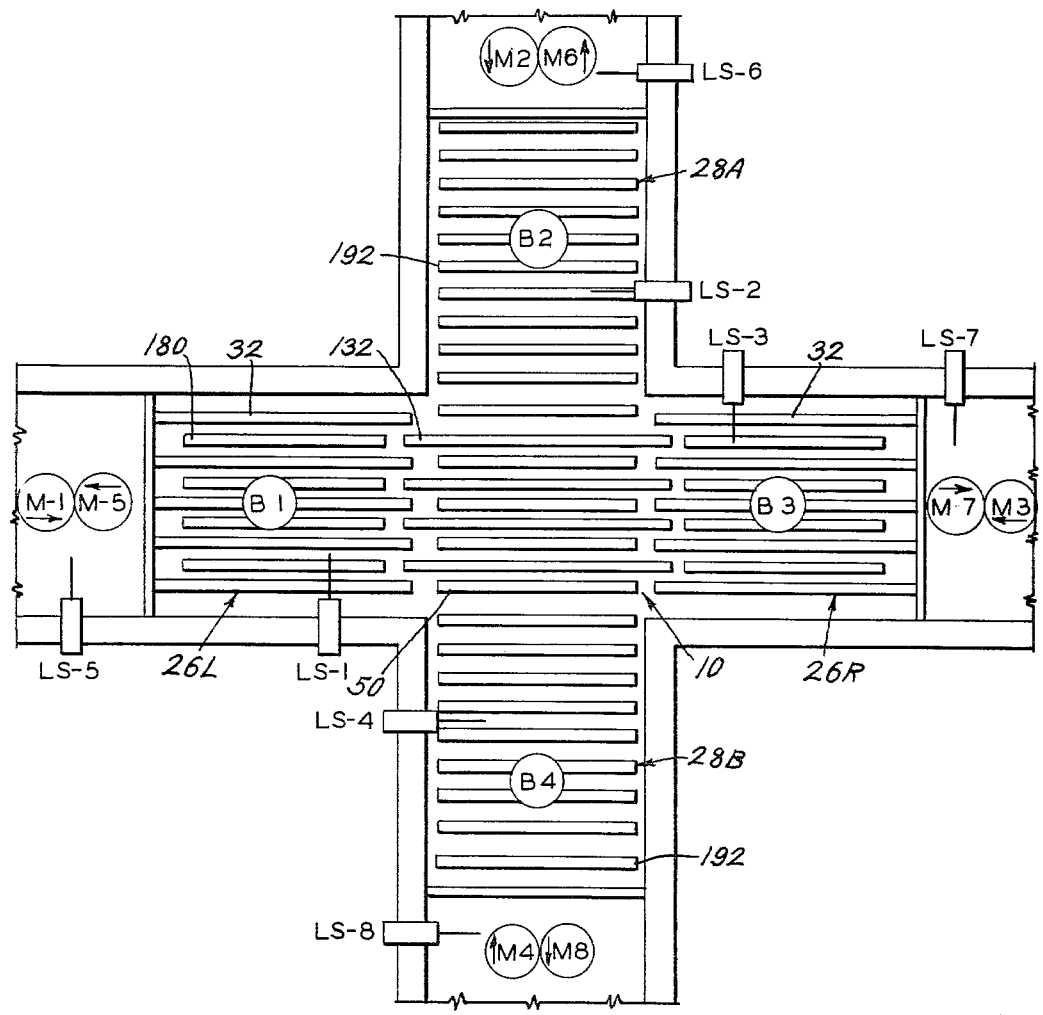
FIGURE 15 is a schematic representation of the controlled intersection assembly in plan view; and, FIGURES 16, 17 and 18 are schematic circuit diagrams of the control circuitry.

Referring now to FIGURE 15, there is shown in plan a representation of the corner transfer unit 10 in combination with belt conveyor holding stations 26L and 26R located, respectively, at the left and right of unit 10 forming an extension thereof and a pair of roller conveyor holding stations 28A and 28B above and below unit 10. Outboard of each holding station 26 and 28 are provided roller conveyor sections to deliver to or accept an article from the intersection 10. Shown in FIGURE 15 diagrammatically are magnetic starters M-1 through M-8 connected through appropriate circuitry to control panel 300 and under command of switches 304 through 310 to control the actuation and direction of transport of an article or articles to or from intersection 10 in the direction of the arrows associated therewith. Additionally shown are brake actuators B-1 through B-4 which are actuated in correlation with the transport to delay movement of articles onto the intersection until the traffic therethrough clears.

Figure 16A:
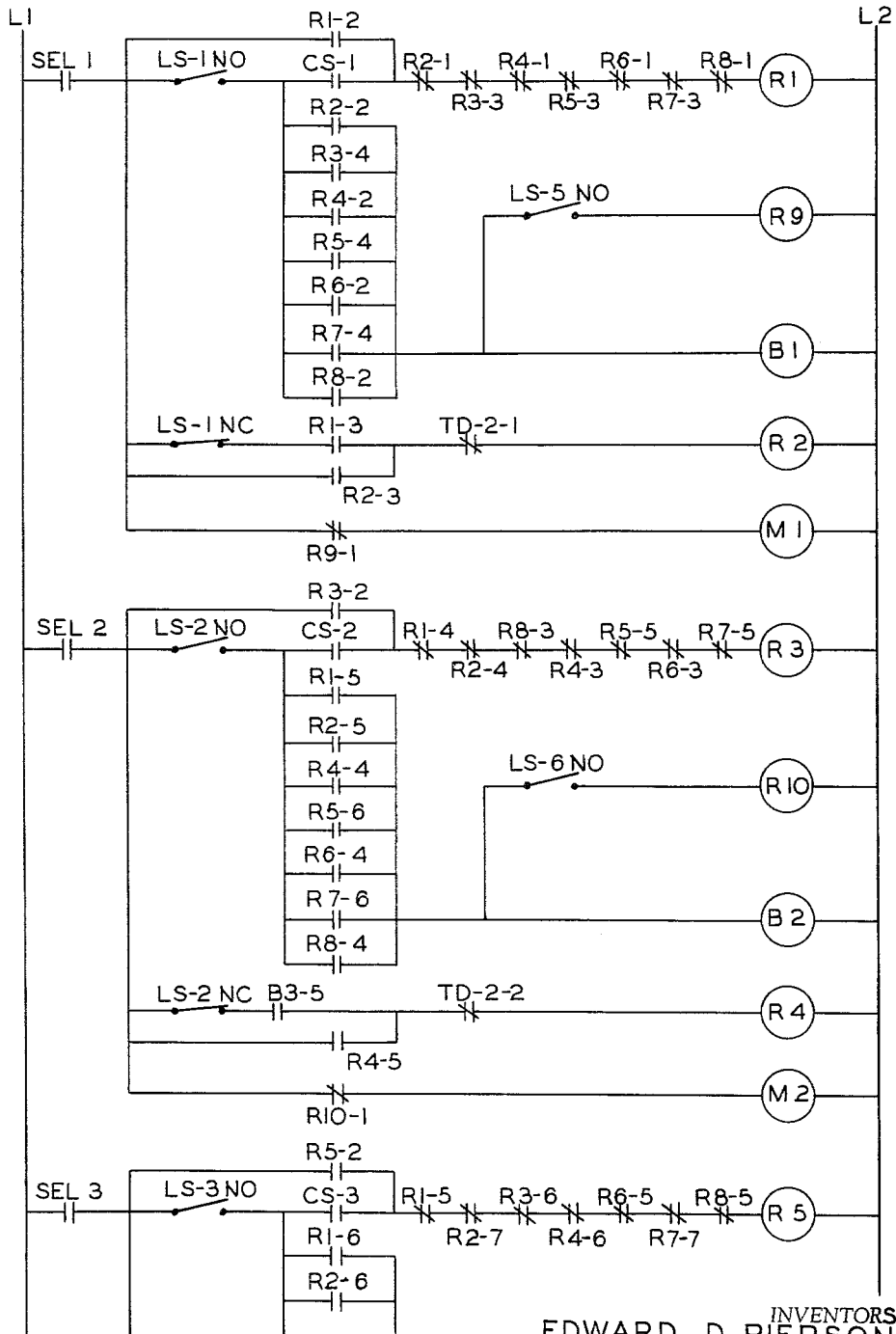
Figure 16B:
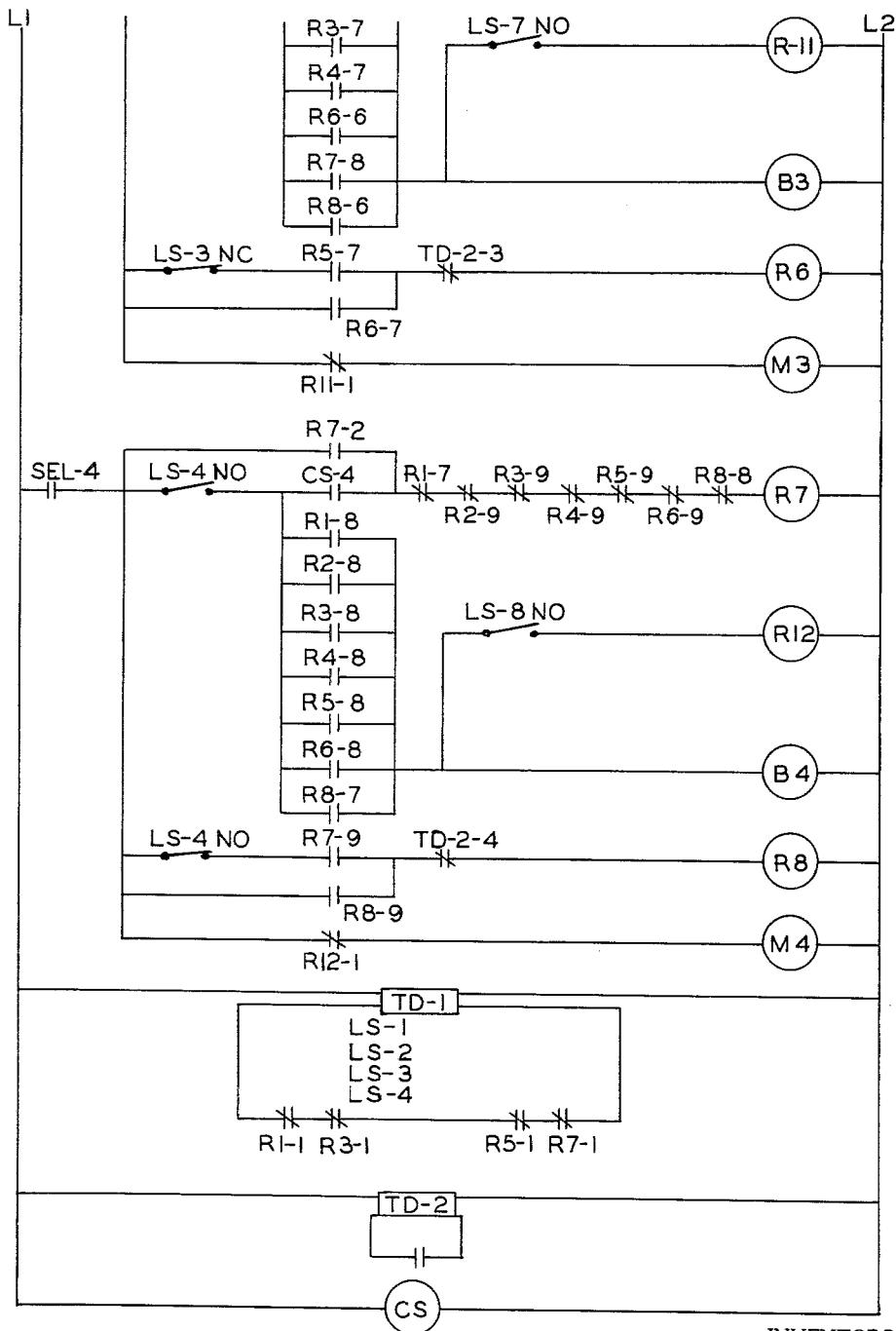
Figure 17A:
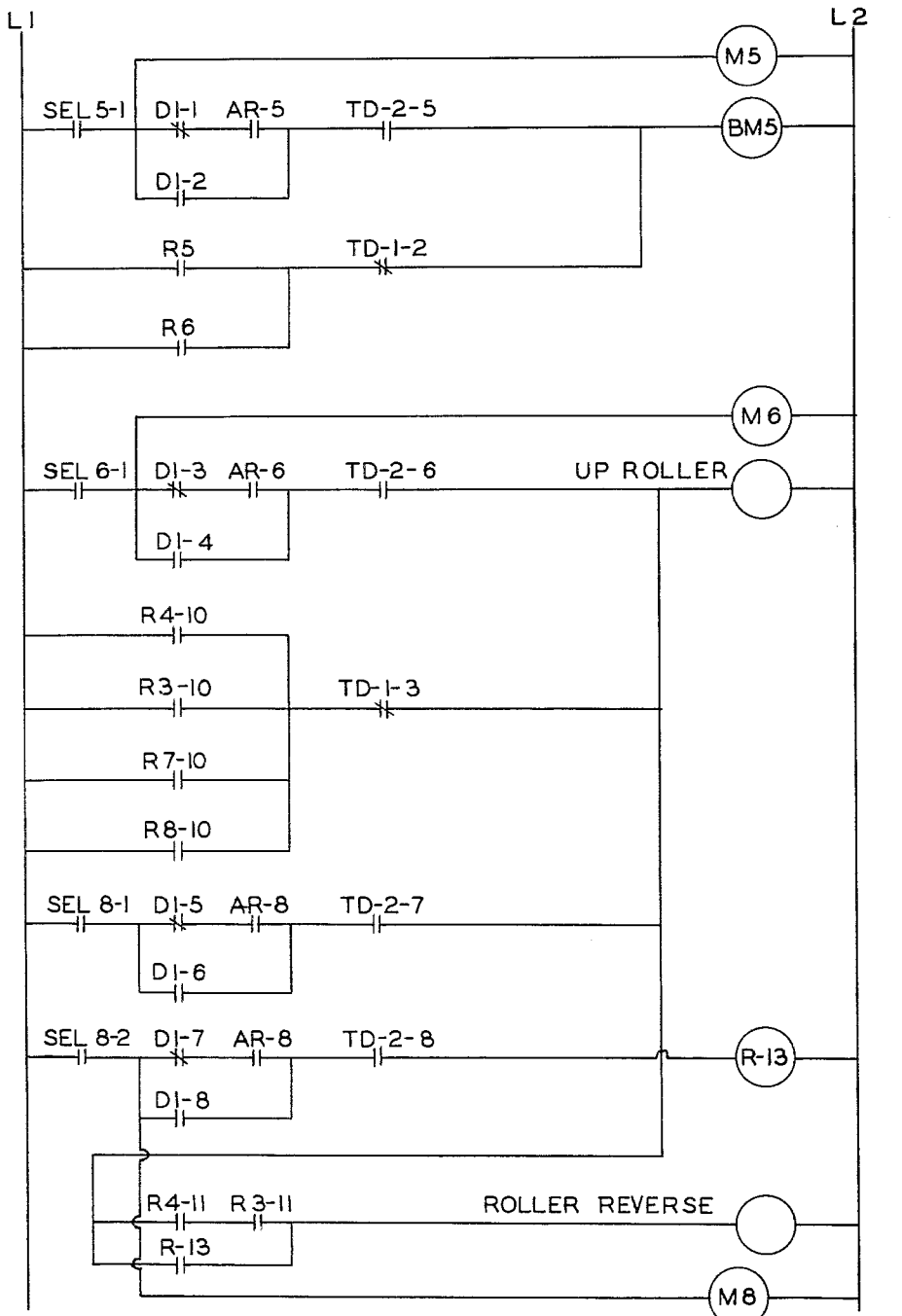
Figures 17B, 18:
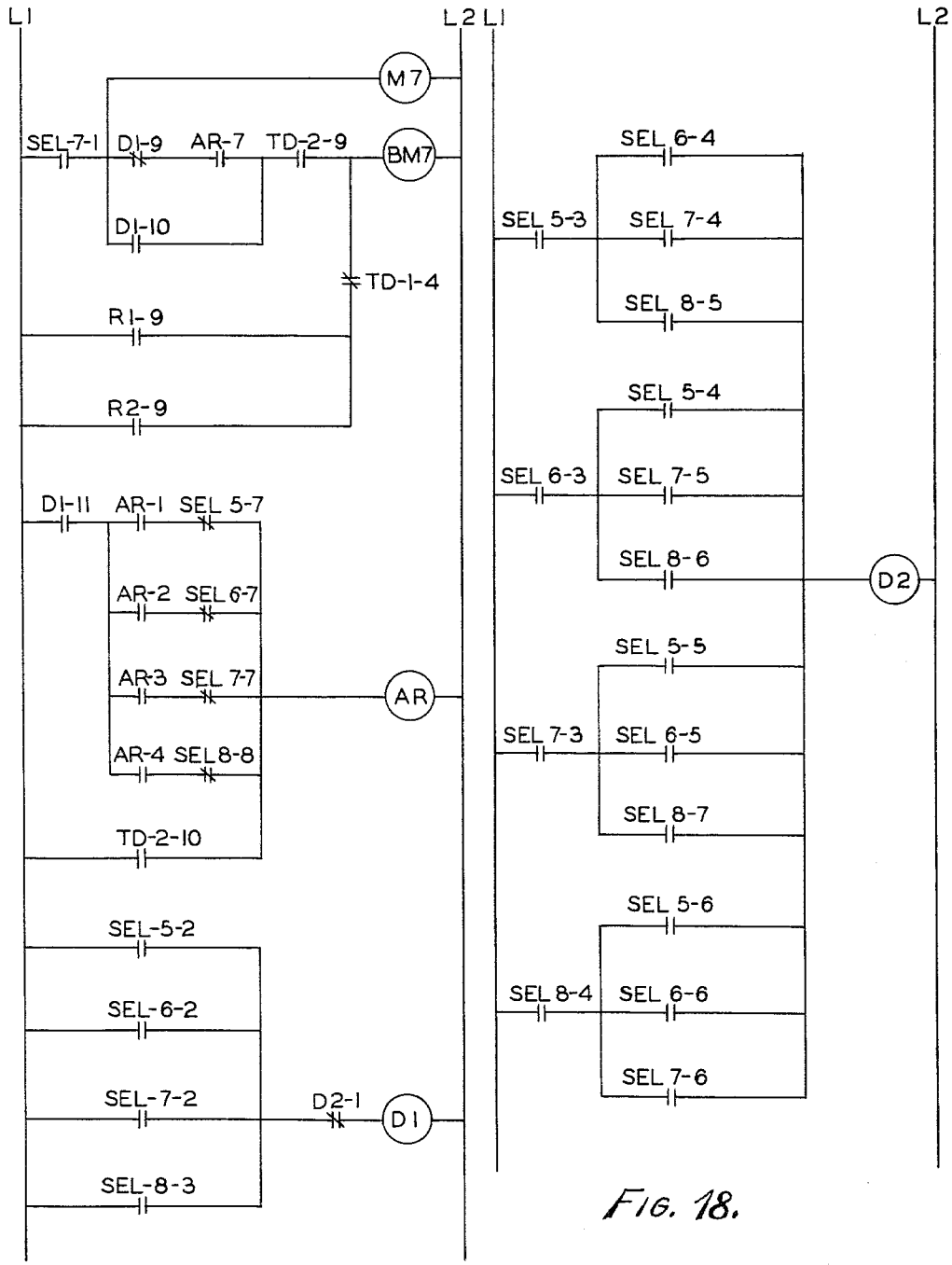

Referring to the circuit diagram of FIGURES 16, 17 and 18, lines $L_1$ and $L_2$ are connected to a suitable source of electric current, not shown. A cycling switch motor CS is connected across the current source and periodically closes normally-open contacts CS-1 through CS-4 in timed sequence. The ingress of an article into intersection 10 is controlled by the selective closure of contact SEL₁ through SEL₄ on actuation of switches 304 through 310.

An example will now be given for the operation of the control circuitry when the control panel 300 is set for the feeding of three lines into a single discharge line to the right and the single line is being fed articles from each of the other arms in sequence. For this type of operation, switch 304 is actuated to close contacts SEL₁, switch 306 to close contact SEL₇, switch 308 to close contact SEL₂; and, switch 310 to close contact SEL₄.

With contacts SEL-1 closed, the magnetic starter M-1 is energized through a normally closed contact R9-1 on relay R9. The magnetic starter M-1 causes the left hand conveyor section, FIGURE 15, to be energized and in a direction to transport articles to the right toward intersection 10. When an article reaches holding station 26L, the normally open contacts LS-1-NO of limit switch LS-1 are closed, while the normally closed contacts LS-1-NC thereof are opened. When the contacts CS-1 of the cycling switch close, a circuit is completed through the coil of relay R1 serially through normally open contacts SEL-1, LS-1-NO, CS-1 and normally-closed contacts R2-1, R3-3, R4-1, R5-1, R7-3 and R8-1. When relay R1 is actuated, normally-closed contact R1-1 opens, starting time relay TD-1, also relay R1 is latched through normally-open contact R1-2 which shunts contacts LD-1-NO and CS-1. At the end of the delay interval of time delay TD-1, contacts TD-1-1 are opened, starting time delay TD-2. The normally-closed contacts TD-1-2, TD-1-3 and TD-1-4 are opened during the time delay period of TD-1 which period is selected to permit sufficient time for an article to travel from a limit switch (LS-1 through LS-4) to the center of the intersection 100.

With contacts SEL7 of switch 306 closed, the magnetic starter M7 is energized, actuating the conveyor section to the right of intersection 10 for movement of articles to the right and away from the intersection. When an article is delivered by the left-hand conveyor section onto holding station 26L, assuming relays R2 through R8 have not been actuated thereby causing brake B1 of 26L to be actuated to delay delivery of the article to section 10, the article will move directly onto intersection 10 to be distributed. As the article moves off of limit switch LS-1, the LS-1-NO contacts open and the LS-1-NC contacts close. Time delay switch TD-2 is not yet energized, and relay R2 is actuated through LS-1-NC, R1-3 and TD-2-1 and latches through contacts R2-3. Actuation of relay R2 drops out relay R1 through contacts R2-1. With the elapse of the TD-1 time interval, the normally closed contacts TD-1-1 and TD-1-4 (FIGURE 17) close, starting time delay switch TD-2. If relays R1 or R2 are still actuated, a circuit is completed through contacts R1-9 or R2-9 (FIGURE 17) and TD-1-4 to belt motor magnetic starter BM7 which starts the belt motor of intersection 10 to drive the belts 132 and move the article to the right onto the conveyor section carrying the article away from the transfer unit or intersection 10.

During the interval that the article is on the holding station and in intersection 10, and while relay R1 is actuated, relays R3 and R5 as well as R7 are locked out because contacts R1-4, R1-5, and R1-7 are open. Magnetic starter M-3 is locked out since SEL-7 is closed which precludes closure of SEL-3 that drives the right hand conveyor section to the left.

During the time interval that an article is being delivered from holding station 26L to intersection 10 and discharged to holding station 26R for delivery to the right hand conveyor section, an article has been resting in holding stations 28A and 28B. At holding station 28A, the limit switch LS-2-NO is closed by the presence of the article and since neither relays R1 nor R2 are actuated until the previously delivered article from 26L clears 26R brake actuator B2 of holding station 28A is energized through SEL-2, LS-2-NO, now closed, and R1-5 or R2-5, now closed. If another article attempts to enter holding station 28A, such article closes limit switch LS-6-NO actuating relay R10, opening contact R10-1 to de-energize magnetic starter M2 shutting down the upper conveyor section until holding station 28A is cleared. A similar holding operation takes place at holding station 28B to energize brake relay B4 through SEL-4, LS-4-NO, and R1-8 or R2-8. Also, the closure of limit switch LS-8-NO will actuate relay R12, opening contact R12-1, de-energizing magnetic start M4, stopping the lower conveyor section.

The cycling switch CS having advanced and moved off of contact CS-1, closes contact CS-2. Relays R1 and R2 having been released, relay R3 is now made up through SEL-2, limit switch SL-2-NO (closed by the presence of an article in holding station 28A), contacts CS-2 and the normally-closed contacts R1-4, R2-4, R8-3, R4-3, R5-5, R6-3 and R7-5. Brake actuator B2 is released since R1-5 and R2-5 are now open and the rollers 192 of holding station 28A are energized to rotate in a direction to move the article onto the transfer unit 10. At the same time a circuit is made up through contacts R3-10 and normally-closed contacts TD1-3-NC to energize the UP-ROLLER solenoid and raise the rollers 50 of the transfer unit. The roller of the transfer unit are rotated in a direction to move the article toward the center of the transefer unit when the roller reverse solenoid ROLLER-REVERSE is energized through R3-11 and R4-11. After the time interval of TD-1 has elapsed, the rollers are lowered since the UP-ROLLER solenoid is no longer energized through contacts TD-1-3 of TD-1, which open.

When the rollers lower, the belts of the transfer unit 10 are being energized in a direction to discharge the article to the right by-belt actuator BM7 through contacts SEL-7 which are closed, AR-7 and TD-2-9. The article is passed to holding station 26R and moved onto the right conveyor section to move the article away from the intersection 10. The right conveyor section is energized through magnetic starter M7 when SEL-7 is closed. It will be noted that relay D-1 will be energized only when the discharge from the intersection is in one direction, in which case contacts D1-9 and AR-7 are by-passed by contacts D1-10 (FIGURE 17). When more than one of the discharge contacts SEL-5, SEL-6-3, SEL-7-3 or SEL-8-4 are closed, a circuit is completed therethrough to energize relay D-2 and open contacts D-2-1 to prevent relay D1 from being energized.

It will also be noted that when relay D1 is energized (only one discharge route) that the ratchet relay AR is taken out of the circuit by the opening of contacts D1-11. When two or more discharge routes are switched into the control, relay D2 is energized. During the time interval relay TD-2 is energized ratchet relay AR is energized through contacts TD-2-10, closing the normally open contacts AR1 through AR4. The ratchet relay then will be stepped to an open SEL contact in series with an AR contact where the relay will wait until the end of the TD2 time, at which point AR will be stepped to the next position. Thus, when articles are discharged in two or more directions, the discharge is in ordered sequence. Where the discharge, however, is only in one direction, the ratchet relay AR is removed from the circuit since there is no need to select the discharge.

When contacts CS-3 of cycle switch CS close, SEL3 contacts are open. Now, the cycle switch has moved to close contacts CS-4. An article is waiting at holding station 28B, closing contacts CS-4-NO and completing a circuit through SEL-4, R1-7, R2-9, R3-9, R4-9, R5-9, R6-9 and R8-8 to relay R7 which is latched in by contacts R7-2 releasing brake solenoid 134. Relay R8 may also be energized through LS-4-NC, which closes as article moves off of LS-4, R7-9 and TD-2-4. A circuit is thus completed through R7-10 or R8-10 and TD-1-3 to energize UP-ROLLER solenoid raising the rollers to the transfer unit. The ROLLER-REVERSE solenoid is not energized (relays R3, R4 and R13 are unenergized) and the rollers are rotated to move the article to the center to the intersection. After the time interval of TD–1 has elapsed, the UP-ROLLER solenoid is de-energized and the rollers are lowered. The article is then moved to the right and through holding station 26R by the belt motor that is actuated by BM7 onto the right conveyor section for discharge to the right. Articles are being held at 26L and 28A to be moved into the intersection during the time interval of TD–1 and then moved out for discharge during the time interval of TD–2.

Thus it is seen that by programming the feeding and discharge pattern into the control panel 300, as many as twenty four different permutations can be set up and operated for feeding articles into and out off the intersection of the present invention in any desired one of the many arrangements. Articles can be programmed and moved at high rates of speed without danger of mishap because of the many fail-safe provisions of the control circuits. While many arrangements are possible, only one has been explained in detail because to explain them all would make this disclosure unduly lengthy and the information given is believed adequate to enable one skilled in the art to trace the operation as it would function for other programs. The operation of the circuit for other program arrangements of the control panel 300 may be readily followed from FIGURES 16, 17 and 18.

Having thus described the several useful and novel features of the present invention, it will be seen that the several worthwhile objectives for which it was designed have been achieved. Although but a single specific embodiment and but one of the many modes of operating same have been disclosed and described in detial herein, we realize that certain changes and modifications may well occur to those skilled in the art within the broad teaching hereof which changes do not involve the exercise of invention; therefore, it is our intention that the scope of protection afforded hereby shall be limited only insofar as said limitations are expressly set forth in the appended claims.

What is claimed is:

1. An intersection assembly for controlling the flow of conveyed articles which comprises: a corner transfer unit including belt and roller conveyors having multiple interlaced belts and rollers capable of moving loads at right angles to one another, said belts defining a fixed horizontal load-carrying surface and said rollers defining a movable horizontal load-carrying surface elevatable from an inoperative position beneath the fixed load-carrying surface to an operative position above the latter, a first prime mover, first elevatable drive means interconnecting the first prime mover and the roller conveyor operative upon actuation to drive the latter and lift it into operative position, and a second prime mover connected to the belt conveyor in driving relation; first belt conveyor holding means positioned at the entrance to the belt conveyor forming an extension thereof and defining a second fixed horizontal load-carrying surface substantially coplanar with the first of said fixed load-carrying surfaces; means inter-connecting the belt conveyor and first belt conveyor holding means operative to drive the latter at the same speed and in the same direction as said belt conveyor; first elevatable platform means disposed beneath and between the belts of the first belt conveyor holding means operative upon actuation to lift a load free of said belts; first roller conveyor holding means positioned at the entrance of the roller conveyor forming an extension thereof, said means including a plurality of rollers defining a third load-carrying surface coplanar with the movable load-carrying surface when the latter is lifted into its operative position, a third prime mover, second friction drive means interconnecting the third prime mover and first roller conveyor holding means in driving relation, and first elevatable braking means disposed beneath the first roller conveyor holding means operative upon actuation to lift the rollers of the latter free of the second friction drive means; and, control means including first sensing means responsive to movement of a load onto the first roller conveyor holding means to operate the first elevatable braking means, second sensing means responsive to movement of a load onto the first belt conveyor holding means to operate the first elevatable platform means, incoming traffic regulating means including scanning means and first time-delay means cooperating to control the release of loads from the holding means, said scanning means being operative to continuously sample the first and second sensing means in sequential order and to deactivate a previously-actuated sensing means sampled thereby releasing the load for movement onto the corner transfer unit, and said scanning means when deactuating the first sensing means being operative to actuate the first elevatable drive means raising the roller conveyor into its operative position, said first time-delay means being operative to delay further sampling of the sensing means by the scanning means for a time period selected to permit the load that has actuated the previously-sampled sensing means to move onto the corner transfer unit, outgoing traffic regulating means responsive to actuation of the incoming traffic regulating means operative to discharge the load from the corner transfer unit in accordance with a predetermined plan, said outgoing traffic regulating means being operative in one mode to actuate the first elevatable drive means while said load is moving across the roller conveyor on the belt conveyor, said outgoing traffic regulating means being operative in a second mode to deactuate the first elevatable drive means previously actuated by the incoming traffic regulating means while said load is moving across the belt conveyor on the roller conveyor, and said outgoing traffic regulating means including second time-delay means responsive to termination of the time-delay period initiated by the first time-delay means and operative to delay entry of a load onto the corner transfer unit for a time period selected to permit a previously-introduced load to clear same.

2. The intersection assembly as set forth in claim 1 in which: the corner transfer unit includes a third elevatable drive means interconnecting the first prime mover and the roller conveyor operative upon actuation to drive the latter in a direction to discharge a load along the first roller conveyor holding means and lift same into operative position, the third prime mover is reversible and connected to the outgoing traffic regulating means; and in which said outgoing traffic regulating means is connected to the second elevatable drive means and is operative to actuate same and simultaneously reverse the third prime mover to discharge loads onto the first roller conveyor holding means when programmed to do so.

3. The intersection assembly as set forth in claim 1 in which: a first power-driven conveyor unit is located out- and connected to the outgoing traffic regulating means of the control means; and in which said outgoing traffic regulating means is operative to reverse the direction of the second prime mover so as to discharge loads onto the first belt conveyor holding means when programmed to do so.

4. The intersection assembly as set forth in claim 1 in which: a first power-drive conveyor unit is located outboard of the roller conveyor holding means in position to deliver loads thereto; a second power-driven conveyor unit is located outboard of the belt conveyor holding means in position to deliver loads thereto; and in which the control means includes third sensing means located near the inboard end of the first power-driven conveyor unit connected to the first sensing means and operative upon actuation by an incoming load when said first sensing means is actuated to stop said first conveyor unit until the roller conveyor holding means is clear, and fourth sensing means located near the inboard end of the second power-driven conveyor unit connected to the second sensing means and operative upon actuation by an incoming load when said second sensing means is actuated to stop said second conveyor unit until the belt conveyor holding means is clear.

5. The intersection assembly as set forth in claim 1 in which: the corner transfer unit includes a third elevatable drive means interconnecting the first prime mover and the roller conveyor operative upon actuation to drive the latter in a direction opposite to that at which they are driven by the first elevatable drive means and lift said roller conveyor into operative position, second roller conveyor holding means located at the opposite end of the roller conveyor from the end occupied by the first roller conveyor holding means, said second roller conveyor holding means including a plurality of rollers defining a fourth load-carrying surface coplanar with said third and movable load-carrying surfaces when the latter is lifted into operative position, a fourth prime mover, fourth friction drive means interconnecting the fourth prime mover and the second roller conveyor holding means in driving relation, second elevatable braking means disposed beneath the second roller conveyor holding means operative upon actuation to lift the rollers of the latter free of said fourth friction drive means, said third and fourth prime movers being reversible; and in which the outgoing traffic regulating means of the control means is connected to the second elevatable drive means and is operative to actuate same to discharge loads onto the first roller conveyor holding means when the latter is programmed to discharge by reversing the third prime mover, and said outgoing traffic regulating means being operative to alternately actuate the first and second elevatable drive means when both the first and second roller conveyor holding means are programmed to discharge by reversing the third and fourth prime movers.

6. The intersection assembly as set forth in claim 1 in which: the second prime mover is instantly reversible; second belt conveyor holding means located at the opposite extremity of the belt conveyor from that occupied by the first belt conveyor holding means in position to form an extension thereof, said second belt conveyor holding means defining a third fixed load-carrying surface coplanar with said first and second fixed load-carrying surfaces, means interconnecting the belt conveyor and second belt conveyor holding means operative to drive the latter at the same speed and in the same direction as said belt conveyor, second elevatable platform means disposed beneath and between the belts of the second belt conveyor holding means operative upon actuation to lift a load free of said belts; and in which the outgoing traffic regulating means is connected to the second prime mover and is operative to reverse same to discharge loads onto the first belt conveyor holding means when the latter is programmed to discharge, and said outgoing traffic regulating means being operative to instantly change the direction of the second prime mover so as to discharge alternately on said first and second belt conveyor holding means when programmed to do so.

7. The intersection assembly as set forth in claim 2 in which: the second prime mover is instantly reversible and connected to the outgoing traffic regulating means of the control means; and in which said outgoing traffic regulating means is operative to reverse the direction of the second prime mover so as to discharge loads onto the first belt conveyor holding means when programmed to do so.

8. The intersection assembly as set forth in claim 4 in which the first conveyor unit and third prime mover are reversible and operatively connected to the outgoing traffic regulating means of the control means; the corner transfer unit includes a third elevatable drive means interconnecting the first prime mover and the roller conveyor operative upon actuation to drive the latter in a direction to discharge a load along the first roller conveyor holding means and lift said roller conveyor into operative position, and in which the outgoing traffic regulating means is connected to the second elevating means and is operative to actuate same and simultaneously reverse the third prime mover and first conveyor unit to discharge loads onto the first roller conveyor holding means when programmed to do so.

9. The intersection assembly as set forth in claim 4 in which: the second conveyor unit and second prime mover are instantly reversible and connected to the outgoing traffic regulating means; and in which said outgoing traffic regulating means is operative to reverse the direction of the second prime mover and second conveyor unit so as to discharge loads into the first belt conveyor holding means when programmed to do so.

10. The intersection assembly as set forth in claim 5 in which: the control means includes a fifth sensing means responsive to movement of an incoming load onto the second roller conveyor holding means operative upon actuation to operate the second braking means holding said load in fixed position, the scanning means being operative to continuously sample the fifth sensing means in sequential order with said first and second sensing means and deactivate any previously-actuated sensing means, and said scanning means being operative to actuate the second elevatable drive means raising the roller conveyor in position to accept a load from the second roller conveyor holding means, and the outgoing traffic regulating means being operative when programmed to discharge a load entering from the second roller conveyor holding means in the direction of movement of the belt conveyor to deactuate the one of said first and second elevatable drive means previously actuated by the incoming traffic regulating means while said load is moving across said belt conveyor on the roller conveyor.

11. The intersection assembly as set forth in claim 5 in which: the second prime mover is instantly reversible; second belt conveyor holding means are located at the opposite extremity of the belt conveyor from that occupied by the first belt conveyor holding means in posiiton to form an extension thereof and define a third fixed horizontal load-carrying surface substantially coplanar with the first and second of said fixed load-carrying surfaces, means interconnecting the belt conveyor and second belt conveyor holding means operative to drive the latter at the same speed and in the same direction as said belt conveyor, second elevatable platform means disposed beneath and between the belts of the second belt conveyor holding means with raised segments thereof projecting upwardly into the spaces therebetween, and second platform elevating means connected to the second platform means operative upon actuation to lift a load free of said belts; and in which the outgoing traffic regulating means is connected to the second prime mover and is operative to reverse same to discharge loads onto the first belt conveyor holding means when the latter is programmed to discharge, and said outgoing traffic regulating means being operative to instantly change the direction of the second prime mover so as to discharge alternately on said first and second belt conveyor holding means when programmed to do so.

12. The intersection assembly as set forth in claim 6 in which: the control means includes a sixth sensing means responsive to movement of an incoming load onto the second belt conveyor holding means operative upon actuation to operate the second elevatable platform means holding said load in fixed position, the scanning means being adapted to continuously sample the sixth sensing means in sequential order with said first and second sensing means and deactivate any previously-actuated sensing means, and the outgoing traffic regulating means being operative when programmed to discharge a load entering from the second belt conveyor holding means in the direction of movement of the roller conveyor to actuate the first elevatable drive means while said load is moving across said roller conveyor on the belt conveyor.

13. The intersection assembly as set forth in claim 8 in which: the second conveyor unit and second prime mover are instantly reversible and connected to the outgoing traffic regulating means; and in which said outgoing traffic regulating means is operative to reverse the direction of the second prime mover and second conveyor unit so as to discharge loads into the first belt conveyor holding means when programmed to do so.

14. The intersection assembly as set forth in claim 10 in which: the second prime mover is instantly reversible; second belt conveyor holding means are located at the opposite extremity of the belt conveyor from that occupied by the first belt conveyor holding means in position to form an extension thereof and define a third fixed horizontal load carrying surface substantially coplanar with the first and second of said fixed load-carrying surfaces, means interconnecting the belt conveyor and second belt conveyor holding means operative to drive the latter at the same speed and in the same direction as said belt conveyor, second elevatable platform means disposed beneath and between the belts of the second belt conveyor holding means a load free as said belts; and in which the outgoing traffic regulating means is connected to the second prime mover and is operative to reverse same to discharge loads onto the first belt conveyor holding means when the latter is programmed to discharge, and said outgoing traffic regulating means being operative to instantly change the direction of the second prime mover so as to discharge alternately on said first and second belt conveyor holding means when programmed to do so.

15. The intersection assembly as set forth in claim 11 in which: a first reversible power-driven conveyor unit is located outboard of the roller conveyor holding means in position to deliver loads thereto; a second reversible power-driven conveyor unit is located outboard of the belt conveyor holding means in position to deliver loads thereto; and in which the control means includes third sensing means located near the inboard end of the first power-driven conveyor unit connected to the first sensing means and operative upon actuation by an incoming load when said first sensing means is actuated to stop said first conveyor unit until the roller conveyor holding station is clear, and fourth sensing means located near the inboard end of the second power-driven conveyor unit connected to the second sensing means and operative upon actuation by an incoming load when said second sensing means is actuated to stop said second conveyor unit until the belt conveyor holding station is clear.

16. The intersection assembly as set forth in claim 12 in which: the corner transfer unit includes a third elevatable drive means interconnecting the first prime mover and the roller conveyor operative upon actuation to drive the latter in a direction opposite to that at which they are driven by the first elevatable drive means and lift said roller conveyor into operative position, second roller conveyor holding means located at the opposite end of the roller coveyor from the end occupied by the first roller conveyor holding means, said second roller conveyor holding means including a plurality of rollers defining a fourth load-carrying surface coplanar with said third and movable load-carrying surfaces when the latter is lifted into operative position, a fourth prime mover, fourth friction drive means interconnecting the fourth prime mover and the second roller conveyor holding means in driving relation, second elevatable braking means disposed beneath the second roller conveyor holding means operative upon actuation to lift the rollers of the latter free of said fourth friction drive means, said third and fourth prime movers being reversible; and in which the outgoing traffic regulating means of the control means is connected to the second elevatable drive means and is operative to actuate same to discharge loads onto the first roller conveyor holding means when the latter is programmed to discharge by reversing the third prime mover, and said outgoing traffic regulating means being operative to alternately actuatae the first and second elevatable drive means when both the first and second roller conveyor holding means are programmed to discharge by reversing the third and fourth prime movers.

17. The intersection assembly as set forth in claim 12 in which: the second prime mover is instantly reversible; second belt conveyor holding means are located at the opposite extremity of the belt conveyor from that occupied by the first belt conveyor holding means in position to form an extension thereof and define a third fixed horizontal load-carrying surface substantially coplanar with the first and second of said fixed load-carrying surfaces, means interconnecting the belt conveyor and second belt conveyor holding means operative to drive the latter at the same speed an in the same direction as said belt conveyor, second elevatable platform means disposed beneath and between the belts of the second belt conveyor holding means with raised segments thereof projecting upwardly into the spaces therebetween, and second platform elevating means connected to the second platform means operative upon actuation to lift a load free of said belts; and in which the outgoing traffic regulating means is connected to the second prime mover and is operative to reverse same to discharge loads onto the first belt conveyor holding means when the latter is programmed to discharge, and said outgoing traffic regulating means being operative to instantly change the direction of the second prime mover so as to discharge alternately on said first and second belt conveyor holding means when programmed to do so.

18. The intersection assembly as set forth in claim 13 in which: the second prime mover is instantly reversible; second belt conveyor holding means are located at the opposite extremity of the belt conveyor from that occupied by the first belt conveyor holding means in position to form an extension thereof and define a third fixed horizontal load-carrying surface substantially coplanar with the first and second of said fixed load-carrying surfaces, means interconnecting the belt conveyor and second belt conveyor holding means operative to drive the latter at the same speed and in the same direction as said belt conveyor, second elevatable platform means disposed beneath and between the belts of the second belt conveyor holding means with raised segments thereof projecting upwardly into the spaces therebetween, and second platform elevating means connected to the second platform means operative upon actuation to lift a load free of said belts; and in which the outgoing traffic regulating means is connected to the second prime mover and is operative to reverse same to discharge loads onto the first belt conveyor holding means when the latter is programmed to discharge, and said outgoing traffic regulating means being operative to instantly change the direction of the second prime mover so as to discharge alternately on said first and second belt conveyor holding means when programmed to do so.

19. The intersection assembly as set forth in claim 17 in which: a first reversible power-driven conveyor unit is located outboard of the roller conveyor holding means in position to deliver loads thereto; a second reversible power-driven conveyor unit is located outboard of the belt conveyor holding means in position to deliver loads thereto; and in which the control means includes third sensing means located near the inboard end of the first power-driven conveyor unit connected to the first sensing means and operative upon actuation by an incoming load when said first sensing means is actuated to stop said first conveyor unit until the roller conveyor holding station is clear, and fourth sensing means located near the inboard end of the second power-driven conveyor unit connected to the second sensing means and operative upon actuation by an incoming load when said second sensing means is actuated to stop said second conveyor unit until the belt conveyor holding station is clear.

20. The intersection assembly as set forth in claim 17 in which: a third reversible power-driven conveyor unit is located outboard of the second roller conveyor holding means in position to deliver loads thereto; a fourth reversible power-driven conveyor unit is located outboard of the second belt conveyor holding means in position to deliver loads thereto; and in which the control means includes seventh sensing means located near the inboard end of the third power-driven conveyor unit connected to the fifth sensing means and operative upon actuation by an incoming load when said fifth sensing means is actuated to stop said third conveyor unit until the second roller conveyor holding station is clear; and eighth sensing means located near the inboard end of the fourth power-driven conveyor unit connected to the sixth sensing means and operative upon actuation by an incoming load when said sixth sensing means is actuated to stop said fourth conveyor unit until the second belt conveyor holding station is clear.

References Cited by the Examiner
UNITED STATES PATENTS

| | | | |
|---|---|---|---|
| 3,088,574 | 5/1963 | Verrinder et al. | 198—21 |
| 3,104,004 | 9/1963 | Poel et al. | 198—20 |
| 3,108,677 | 10/1963 | Temple | 198—21 |
| 3,134,476 | 5/1964 | Pierson et al. | 198—20 |

SAMUEL F. COLEMAN, *Primary Examiner.*

WILLIAM B. LABORDE, *Examiner.*